(12) United States Patent
Rooney

(10) Patent No.: US 9,828,968 B1
(45) Date of Patent: Nov. 28, 2017

(54) HYDROQUEEN

(71) Applicant: Dorraine Marie Rooney, Wesley Chapel, FL (US)

(72) Inventor: Dorraine Marie Rooney, Wesley Chapel, FL (US)

(*) Notice: Subject to any disclaimer, the term of this patent is extended or adjusted under 35 U.S.C. 154(b) by 129 days.

(21) Appl. No.: 14/930,903

(22) Filed: Nov. 3, 2015

Related U.S. Application Data

(63) Continuation-in-part of application No. 14/096,239, filed on Feb. 11, 2014, now abandoned.

(51) Int. Cl.
| | | |
|---|---|---|
| *F03B 17/06* | (2006.01) | |
| *F03B 13/00* | (2006.01) | |
| *F03G 7/00* | (2006.01) | |

(52) U.S. Cl.
CPC .............. *F03B 17/06* (2013.01); *F03B 13/00* (2013.01); *F03G 7/00* (2013.01)

(58) Field of Classification Search
CPC ........... Y02E 10/28; Y02E 10/22; F03B 13/00
USPC ..................................................... 290/54, 43
See application file for complete search history.

(56) References Cited

U.S. PATENT DOCUMENTS

| | | | | | |
|---|---|---|---|---|---|
| 4,303,835 | A | * | 12/1981 | Bair | F03D 3/068 290/44 |
| 4,500,259 | A | * | 2/1985 | Schumacher | F03B 17/063 416/122 |
| 7,849,596 | B2 | * | 12/2010 | Sauer | B23P 15/006 29/889.7 |
| 8,614,523 | B2 | * | 12/2013 | Reynolds | F01D 1/22 290/54 |
| 2009/0022597 | A1 | * | 1/2009 | Bowie | F03B 17/061 416/223 R |

FOREIGN PATENT DOCUMENTS

| | | | | | |
|---|---|---|---|---|---|
| GB | | 2386161 A | * | 9/2003 | ........... B65G 33/265 |
| WO | WO 2013006061 A1 | | * | 1/2013 | .............. F03B 17/06 |

* cited by examiner

*Primary Examiner* — Tulsidas C Patel
*Assistant Examiner* — Charles Reid, Jr.

(57) ABSTRACT

The device, herein to be known as the HydroQueen, is a device to convert the kinetic energy of a fluid into electrical energy using a single or multiple helix shaped vertical paddles. The helix shaped vertical paddle rotates around its axis from the force placed on face of paddle by the movement of the fluid. The electricity is generated by the rotation of the paddle around its axis. The number, length, radii, and pitch of the paddles may vary depending on the location and/or application.

1 Claim, 7 Drawing Sheets

VERTICAL VIEW

PLAN / SECTION VIEW

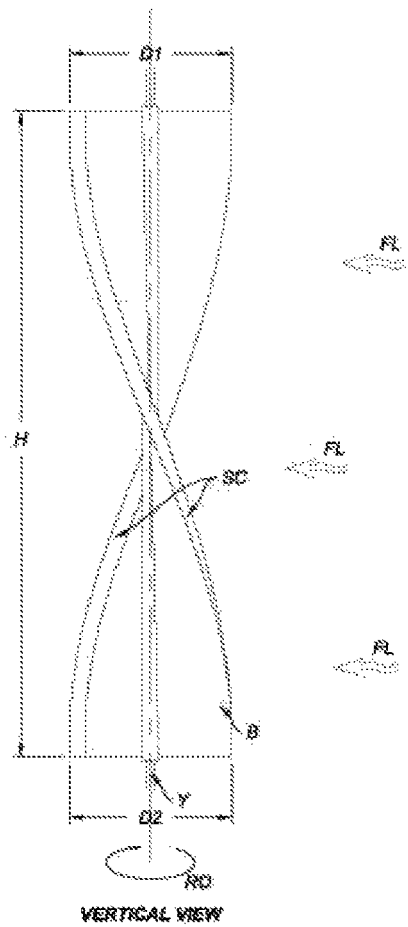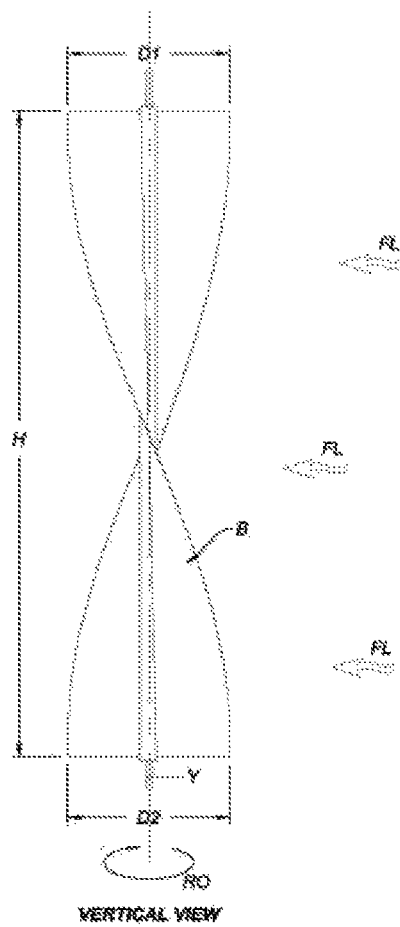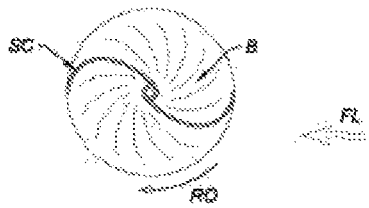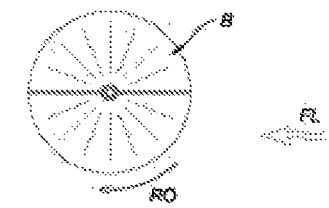

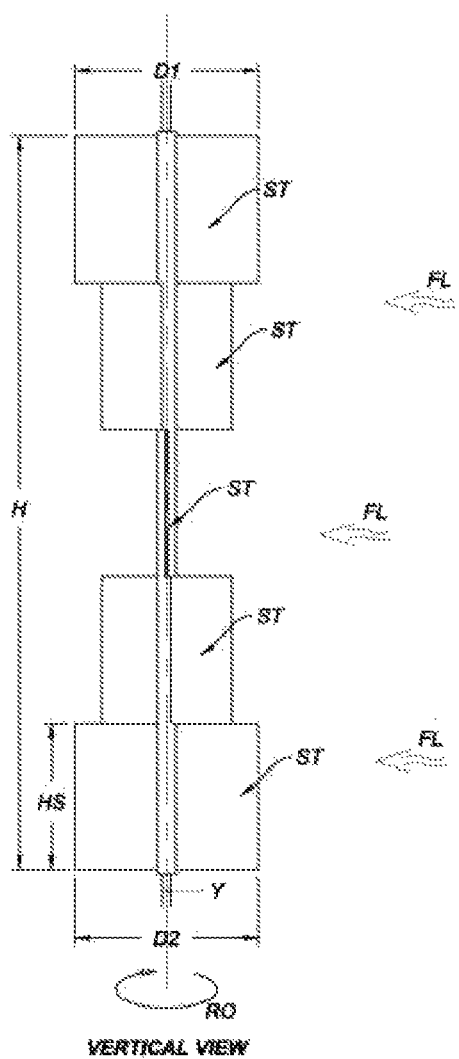
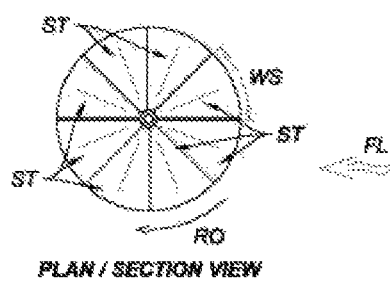
FIG.3

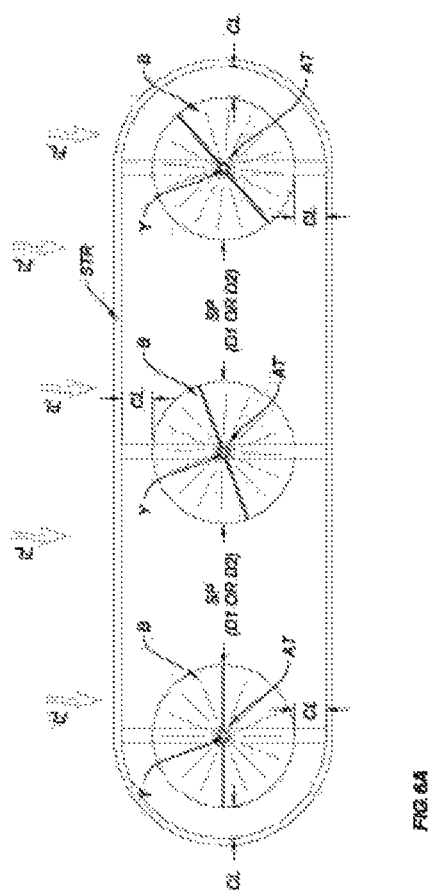

HYDROQUEEN

BRIEF DESCRIPTION OF THE FIGURES

Embodiments of the invention will now be described, by way of example only, by reference to the accompanying drawings, in which:

FIG. 1 shows a variation of the helix shaped vertical paddle with a scoop shaped paddle in horizontal view and plan view with a cross section hatched;

FIG. 2 shows a variation of the helix shaped vertical paddle with a flat paddle in horizontal view and plan view with a cross section hatched;

FIG. 3 shows a variation of the helix shaped vertical paddle with a stepped paddle in horizontal view plan view with a cross section hatched;

FIG. 6A shows a multiple helix shaped vertical paddle application with the paddles arranged in a straight line with a support structure around the multiple helix shaped vertical paddles and electrical generation in plan view;

DETAILED DESCRIPTION OF THE FIGURES

FIG. 1, 2, 3 shows examples of possible variations in details of the paddle shape though all three keep the general vertical helix paddle shape.

FIG. 1 shows a vertical helix paddle with a rotor blade B with a scooped edged SC that can vary in curvature depending on application and location along the edge of the rotor blade B. The flow of the fluid FL is perpendicular to the rotor blade B forcing the rotation RO around the central axis Y. The outer rotating diameter D2 at the bottom of the paddle may equal or vary from the outer rotating diameter D1 at the top of the paddle. The height H is not set and will vary depending on the application of the paddle.

FIG. 2 shows a vertical helix paddle with a rotor blade B that is smooth and flat extending outward perpendicularly from the central axis Y. The flow of the fluid FL is perpendicular to the rotor blade B forcing the rotation RO around the central axis Y. The outer rotating diameter D2 at the bottom of the paddle may equal or vary from the outer rotating diameter D1 at the top of the paddle. The height H is not set and will vary depending on the application of the paddle.

FIG. 3 shows a vertical helix paddle with a stepped shaped rotor blade ST. The number of stepped rotor blades can vary based on the application. The height HS of each stepped rotor blade will be an even division of the total height H of the paddle and the quantity of stepped shaped rotor blade ST (shown in the vertical view) along the vertical shaft Y of the paddle. Each stepped rotor blade has a vertical face the is perpendicular to the flow the fluid FL and extending outward perpendicularly from the central axis Y. The flow of the fluid FL is perpendicular to the rotor blade B forcing the rotation RO around the central axis Y. Each stepped shaped rotor blade ST has a horizontal face (shown in the plan/section view) connecting the vertical faces of the stepped shaped rotor blade ST. The inner width will depend on the number of stepped shaped rotor blades ST and the radius of the central shaft. The outer width will be an equal division of the outer rotating diameter at the step by the number of stepped shaped rotor blades ST for the paddle. The outer rotating diameter D2 at the bottom of the paddle may equal or vary from the outer rotating diameter D1 at the top of the paddle. The height H is not set and will vary depending on the application of the paddle.

Figure 4:
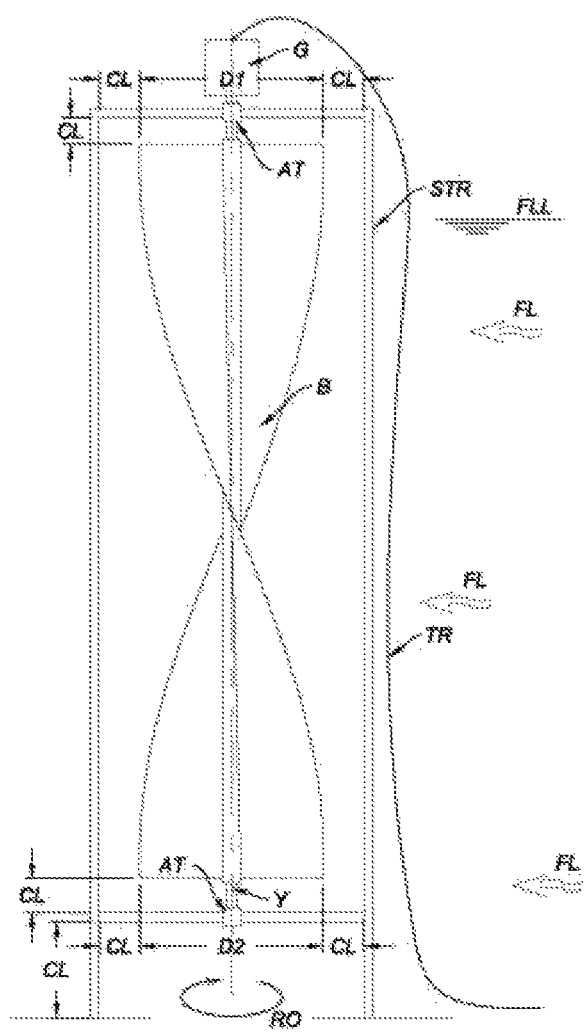
FIG. 4 shows a single helix shaped vertical paddle application with structural support and electrical generation.

FIG. 4 shows the HydroQueen using a single paddle. The paddle shown in FIG. 4 has a vertical helix paddle with a smooth rotor blade B, but the vertical helix paddle rotor blades may vary based on the application. The outer structure STR has will be made of a noncorrosive material with strength to protect the paddle. The STR will have a solid base or will be embedded into a solid base. This base is to be either earth, concrete or some other solid material. The vertical helix paddle is to be attached to the structure STR with attachment points AT that are secure yet allow the vertical helix paddle to rotate freely. The vertical helix paddle will be attached to a mechanism to generate electricity G. This mechanism to generate electricity G can be attached directly to the central shaft Y of the vertical helix paddle. The electrical energy will be transmitted away from the HydroQueen using a wire TR. The transmission TR of electricity will be placed outside the structure STR and free from obstruction of the rotating paddles. The clearance CL between the paddle rotor blade B and the structure STR must meet current safety regulations. The clearance CL between the base and the bottom attachment point AT must meet current safety regulations.

Figure 5:
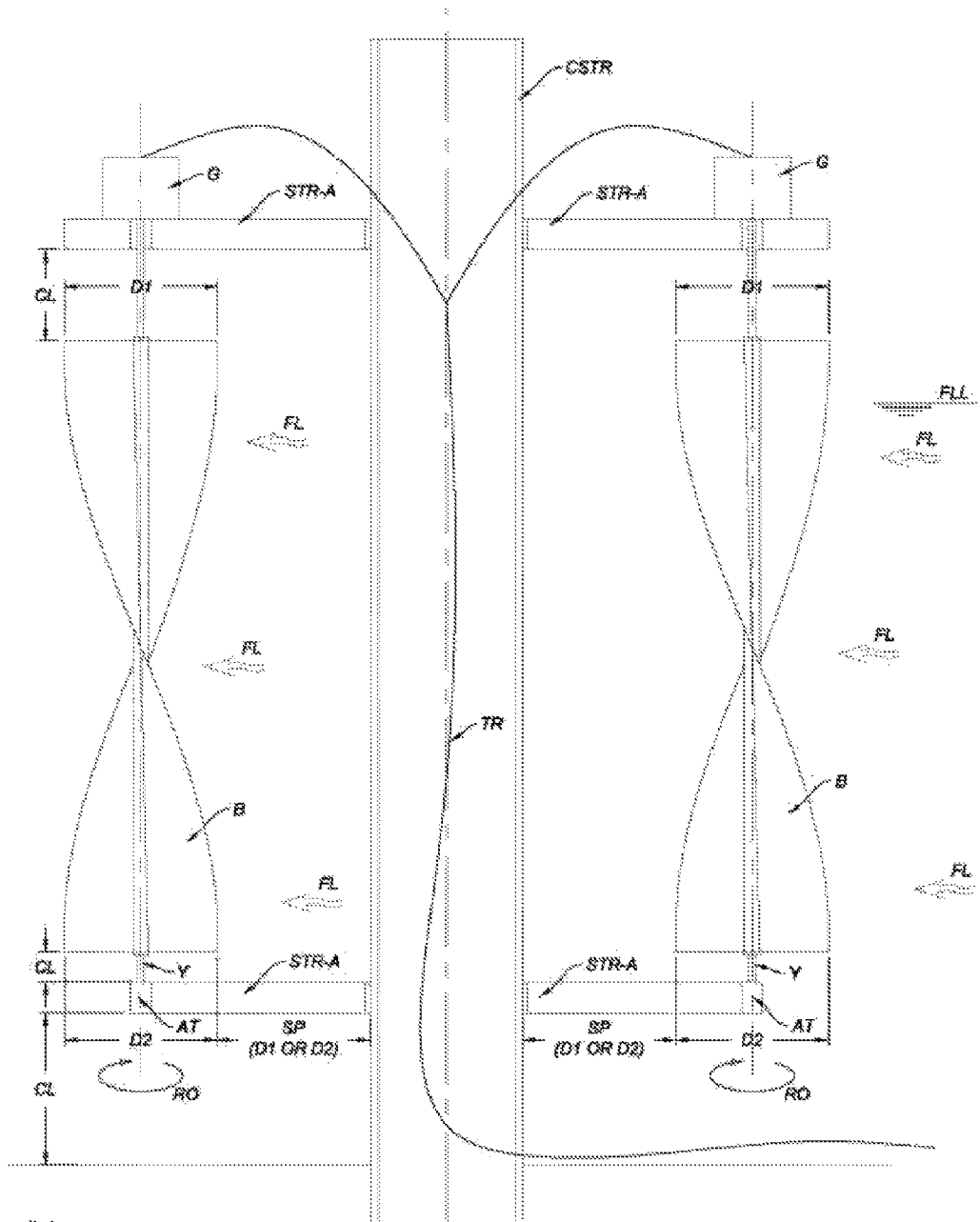
FIG. 5 shows a multiple helix shaped vertical paddle application with the paddles arranged around a central support and electrical generation.

FIG. 5 shows the HydroQueen using multiple paddles around a central structure CSTR. The clearance CL between the paddle rotor blade B and the structure STR must meet current safety regulations. The vertical helix paddles are to be attached to the structural arms STR-A with attachment points AT that are secure yet allow the vertical helix paddle to rotate freely. The structural arms STR-A are attached perpendicular to the central structure CSTR. The structural arms STR-A are arranged radial to the central structure CSTR. The vertical helix paddles' rotor blades B may have the ability to move freely vertically along the central axis Y or be put in a fixed location. The vertical helix paddle is to be placed at least the widest outer rotating diameter (D1 or D2) from the outside of the central structure CSTR. The vertical helix paddle will be attached to a mechanism to generate electricity G. This mechanism to generate electricity G can be attached directly to the central shaft Y of the vertical helix paddle. The electrical energy will be transmitted away from the HydroQueen using a wire TR. The transmission TR of electricity will be placed inside the central structure CSTR and free from obstruction of the rotating paddles. The clearance CL between the paddle rotor blade B and the structural arms STR-A must meet current safety regulations. The clearance CL between the base and the bottom structural arm STR-A and attachment point AT must meet current safety regulations. The central structure CSTR is have a solid base or to be embedded into a solid base. That base may consist of earth, concrete or some other solid structure.

Figure 5A:
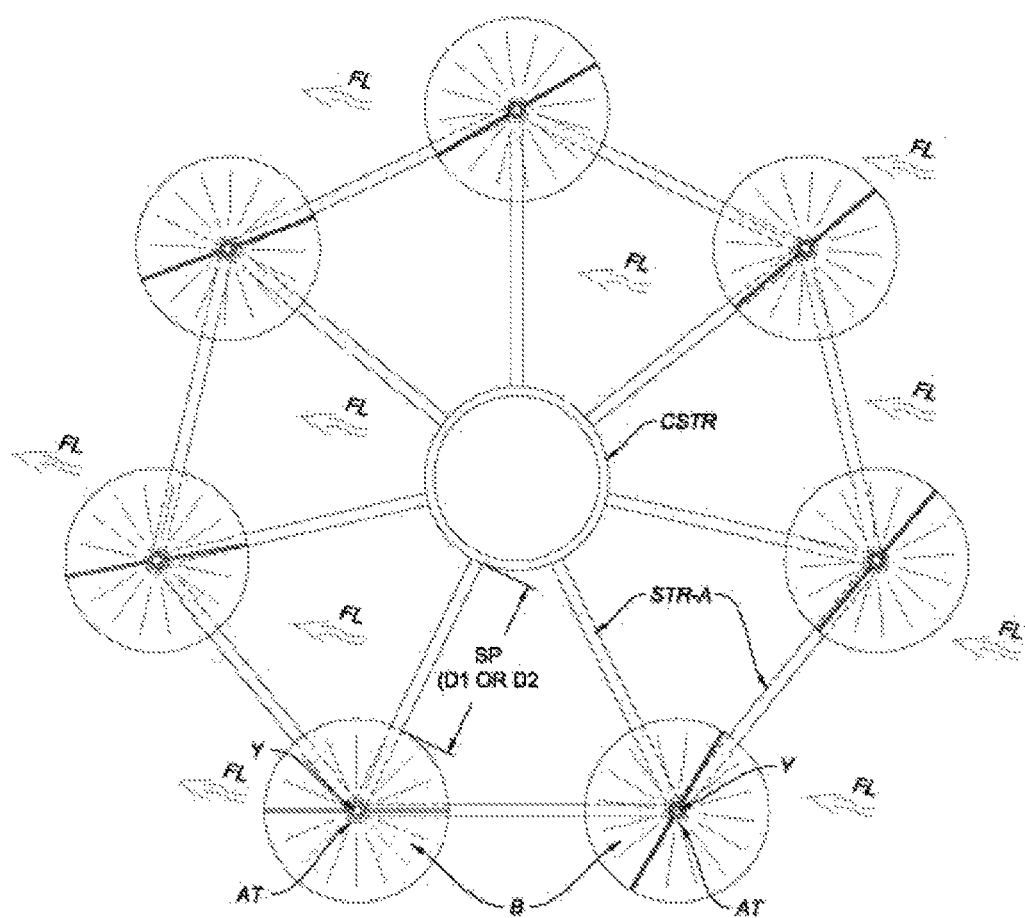
FIG. 5A shows a multiple helix shaped vertical paddle application with the paddles arranged around a central support in plan view.

FIG. 5A shows [multiple helix shaped vertical applications with paddles arranged around central support and electrical generation] the contents of FIG. 5 in plan view.

Figure 6:
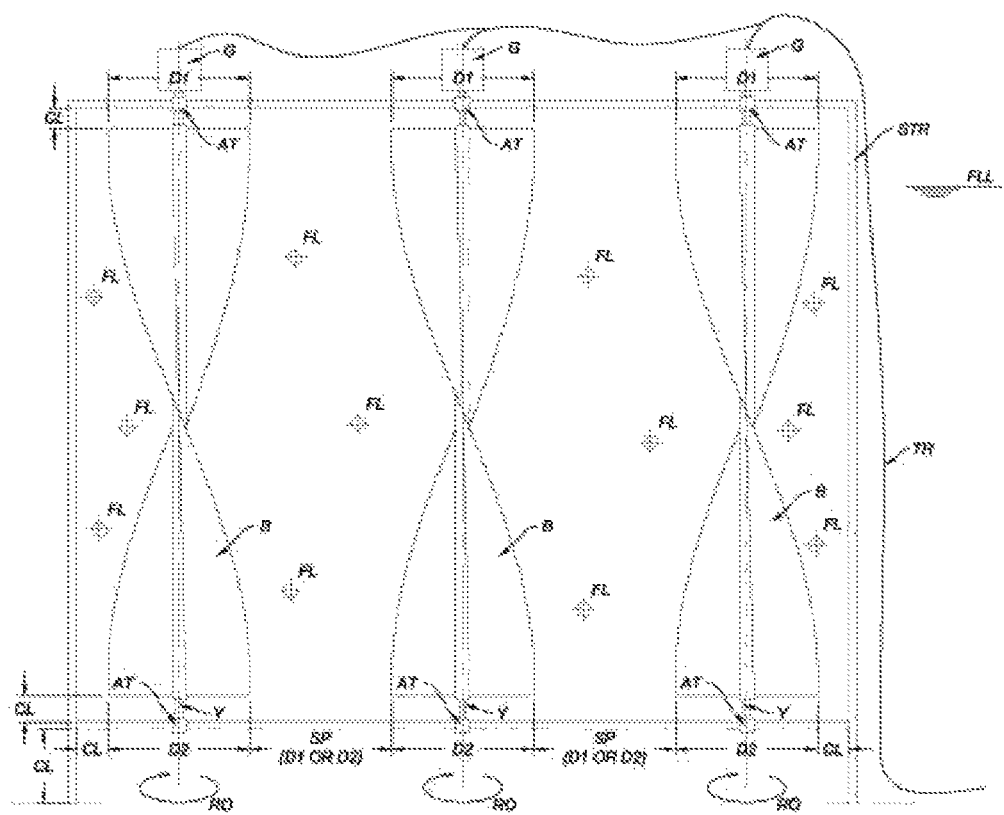
FIG. 6 shows a multiple helix shaped vertical paddle application with the paddles arranged in a straight line with a support structure around the multiple helix shaped vertical paddles and electrical generation.

FIG. 6 shows the HydroQueen using multiple paddles in a linear structure. The structure surrounds the paddles to protect them for obstruction. The separation SP between the paddles should be at least the widest outer rotating diameter (D1 or D2). The outer structure STR will be made of a noncorrosive material with strength to protect the paddle. The outer structure STR will have a solid base or will be embedded into a solid base. This base is to be either earth, concrete or some other solid material. The vertical helix paddle is to be attached to the structure STR with attachment points AT that are secure yet allow the vertical helix paddle to rotate freely. The vertical helix paddle will be attached to a mechanism to generate electricity G. This mechanism to generate electricity G can be attached directly to the central shaft Y of the vertical helix paddle. The electrical energy will be transmitted away from the HydroQueen using a wire TR. The transmission TR of electricity will be placed outside the structure STR and free from obstruction of the rotating paddles. The clearance CL between the paddle rotor blade B and the structure STR must meet current safety regulations. The clearance CL between the base and the bottom attachment point AT must meet current safety regulations.

I claim:

1. An apparatus for extracting energy from the kinetic energy of a fluid comprising:
    at least one rotor blade attached to a shaft having a central axis connected to a generator to generate electricity, wherein said electricity is transmitted to a load via a wire;
    an outer structure having a solid base or the outer structure embedded into a sea floor;
    the at least one rotor blade is vertical in orientation and generally perpendicular to the fluid flow;
    wherein the at least one rotor blade has a scoop shape at the ends;
    the at least one rotor blade having a configuration with a plurality of steps wherein each step has a different diameter compared to an adjacent step and the at least one rotor blade having an irregular not smoothed helix shape;
    wherein the at least one rotor blade is at least completely or partially below the fluid surface;
    the at least one rotor blade comprises a plurality of rotor blades;
    a central structure with a plurality of first structural arms, wherein the rotor blades are arranged radially via the structural arms around said central structure;
    the first structural arms are attached perpendicular from the central structure to the rotor blades;
    a plurality of second structural arms, wherein each rotor blade is connected to the other rotor blade via the second structural arms attached to the center axis of the shaft of each of the rotor blades.

* * * * *